(12) United States Patent
Clarke et al.

(10) Patent No.: US 7,170,061 B2
(45) Date of Patent: Jan. 30, 2007

(54) RUGGEDIZED SCINTILLATION DETECTOR WITH LOW ENERGY DETECTION CAPABILITIES

(75) Inventors: Lucas Lemar Clarke, Uniontown, OH (US); James R. Williams, University Heights, OH (US); Brian M Palmer, Twinsburg, OH (US); Jeffrey Louis Johanning, Hudson, OH (US); Keith David Jones, Macedonia, OH (US); Andrew E Shalhoub, Twinsburg, OH (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 10/820,039

(22) Filed: Apr. 8, 2004

(65) Prior Publication Data

US 2005/0224717 A1   Oct. 13, 2005

(51) Int. Cl.
*G01T 1/20* (2006.01)
(52) U.S. Cl. .................................. 250/361 R
(58) Field of Classification Search ............. 250/361 R
See application file for complete search history.

(56) References Cited

U.S. PATENT DOCUMENTS

| | | | | |
|---|---|---|---|---|
| 3,087,060 A | * | 4/1963 | Omohundro et al. ... | 250/361 R |
| 3,704,877 A | * | 12/1972 | Nunes et al. ................ | 267/166 |
| 4,879,463 A | | 11/1989 | Wraight et al. | |
| 4,994,673 A | * | 2/1991 | Perna et al. ............. | 250/483.1 |
| 5,005,422 A | | 4/1991 | Ruscev et al. | |
| 5,030,830 A | | 7/1991 | Okada | |
| 5,120,963 A | * | 6/1992 | Robinson et al. ...... | 250/363.01 |
| 5,408,097 A | | 4/1995 | Wraight et al. | |
| 5,962,855 A | * | 10/1999 | Frederick et al. ....... | 250/361 R |
| 6,222,192 B1 | | 4/2001 | Sekela et al. | |
| 6,355,932 B1 | | 3/2002 | Frederick | |
| 6,359,282 B1 | | 3/2002 | Sekela | |
| 6,465,788 B1 | | 10/2002 | Medley | |
| 6,657,199 B2 | | 12/2003 | Frederick et al. | |

FOREIGN PATENT DOCUMENTS

WO    WO 2003/083512    10/2003

OTHER PUBLICATIONS

U.S. Appl. No. 10/065,258, filed Sep. 30, 2002, Williams.

* cited by examiner

*Primary Examiner*—Constantine Hannaher
(74) *Attorney, Agent, or Firm*—Nixon & Vanderhye, P.C.

(57) ABSTRACT

A radiation detector includes a housing, a crystal and a photomultiplier tube supported in the housing. A plurality of elongated, flat plastic or ceramic springs are located radially between the crystal and photomultiplier tube and the housing, and at least one additional spring is located at one end of the crystal.

19 Claims, 6 Drawing Sheets

RUGGEDIZED SCINTILLATION DETECTOR WITH LOW ENERGY DETECTION CAPABILITIES

BACKGROUND OF THE INVENTION

This invention relates generally to radiation detectors and, more specifically, to a suspension and protection system for a radiation detector enclosed within a housing.

Existing radiation detectors are often subjected to varying degrees of shock and/or vibration during normal usage. In some cases, the degree of shock and/or vibration exposure may be quite severe. Deleterious effects from shock and/or vibration may include high background counts, noise in the detector's response spectrum, and even breakage of the detector.

Existing shock and vibration isolation systems for radiation detectors typically include either an elastomeric boot that is telescoped over the radiation detector, or a foam pad that is wrapped around the radiation detector. Recently, some detectors have been designed with a suspension system including flat springs made from spring steel placed along the length of the detector in spaced circumferentially about the diameter of the detector. This has the effect of using the springs as a simply supported type beam, flexed between the OD of the radiation detector and the ID of its housing. These springs then absorb as well as transmit without amplification the shock and vibration that the detector experiences. Additionally, they lock the detector into place to prevent the detector from moving radially inside of its housing. This arrangement has been shown to provide higher degrees of shock and vibration protection than the elastomeric and foam types of suspension systems. Additionally, the radial spring-type suspension makes it possible to package a larger size radiation detector into the same size outer envelope than would normally be possible with elastomers or foam padding.

There are two main drawbacks associated with radial spring suspension systems of the type described above. The first drawback arises from the attenuation of the gamma rays as they pass through the (spring) steel springs. This prohibits the measurement of low energy gamma radiation (below 60 KeV). The second drawback comes from detectors with electrical insulation located radially between the outside of the detector and the inside of the housing. In this case, the steel springs conduct electricity, thereby undesirably forming a circuit between the detector's outer diameter and the housing's inner diameter.

By replacing the spring steel with a material that attenuates the gamma rays less, but still provides a comparable degree of shock and vibration isolation, a detector can be constructed that will exhibit significantly better performance at low energy gamma levels, i.e., below 60 KeV. Using non-metallic springs also prevents formation of the aforementioned electrical circuit.

BRIEF DESCRIPTION OF THE INVENTION

This invention provides a ruggedized radiation detector with a unique suspension/protection system. Generally, the detector includes a scintillation crystal (usually sodium iodide doped with thallium); a photomultiplier tube (PMT); a metallic or plastic housing around the crystal and PMT; and a suspension system inside the housing, arranged about the outer dimensions of the crystal and PMT, as well as axially between the crystal and the housing.

The crystal in the exemplary embodiment is in the form of a cylinder. The cylinder dimensions may vary depending on the particular detector. The typical sodium iodide crystal doped with thallium (NaI(Tl)) has been used in radiation detectors since 1920 and has well known properties for gamma sensitivity, spectral resolution and light output.

In the exemplary embodiment, plastic or ceramic springs are placed around and along the length of the scintillation crystal as well as around and along the length of the PMT. Since the flat springs are fitted at spaced locations about the diameter of the crystal, and axially inserted into the cylindrical housing, they will be under some degree of flexion, thus allowing them to both dampen vibration as well as to protect the crystal from shock and to not amplify and transmit shock or vibration forces. The crystal is also provided with an axial suspension system including wave springs mounted between one end of the crystal and the detector housing. Compression plates to evenly distribute the load of the springs on the crystal will be used on either side of the springs. The axial suspension system is also used to maintain optical coupling between the crystal and PMT.

It will be appreciated, however, that the suspension system described herein may be employed in crystal-only packages as well.

The housing of the radiation detector may be made of any suitable plastic or metal material including thin walled aluminum or Mumetal® in cases where protection from magnetic fields is required.

Accordingly, in one aspect, the invention relates to a radiation detector comprising a housing; a substantially cylindrical scintillation crystal and a photomultiplier tube supported in the housing; and a plurality of elongated non-metallic springs extending along the crystal and the photomultiplier tube, radially between the crystal and photomultiplier tube and the housing.

In another aspect, the invention relates to a radiation detector comprising a housing, a substantially cylindrical crystal and a photomultiplier tube supported in the housing; a plurality of elongated plastic or ceramic springs circumferentially spaced about and extending along the crystal and the photomultiplier tube, radially between the crystal and photomultiplier tube assembly and the housing; and at least one resilient member located at one end of the crystal, axially between an end wall of the housing and the crystal.

In another aspect, the invention relates to a radiation detector comprising a housing, a substantially cylindrical crystal and a photomultiplier tube supported in the housing; ceramic radial suspension means located radially between the crystal and photomultiplier tube and the housing; and axial suspension means located at one end of the crystal, axially between an end wall of the housing and the crystal.

In still another aspect, the invention relates to a scintillation crystal package comprising a housing; a substantially cylindrical scintillation crystal supported in the housing; and a plurality of elongated non-metallic springs extending along the crystal, radially between the crystal and the housing.

The invention will now be described in detail in connection with the above identified drawings.

DETAILED DESCRIPTION OF THE INVENTION

Figure 1:
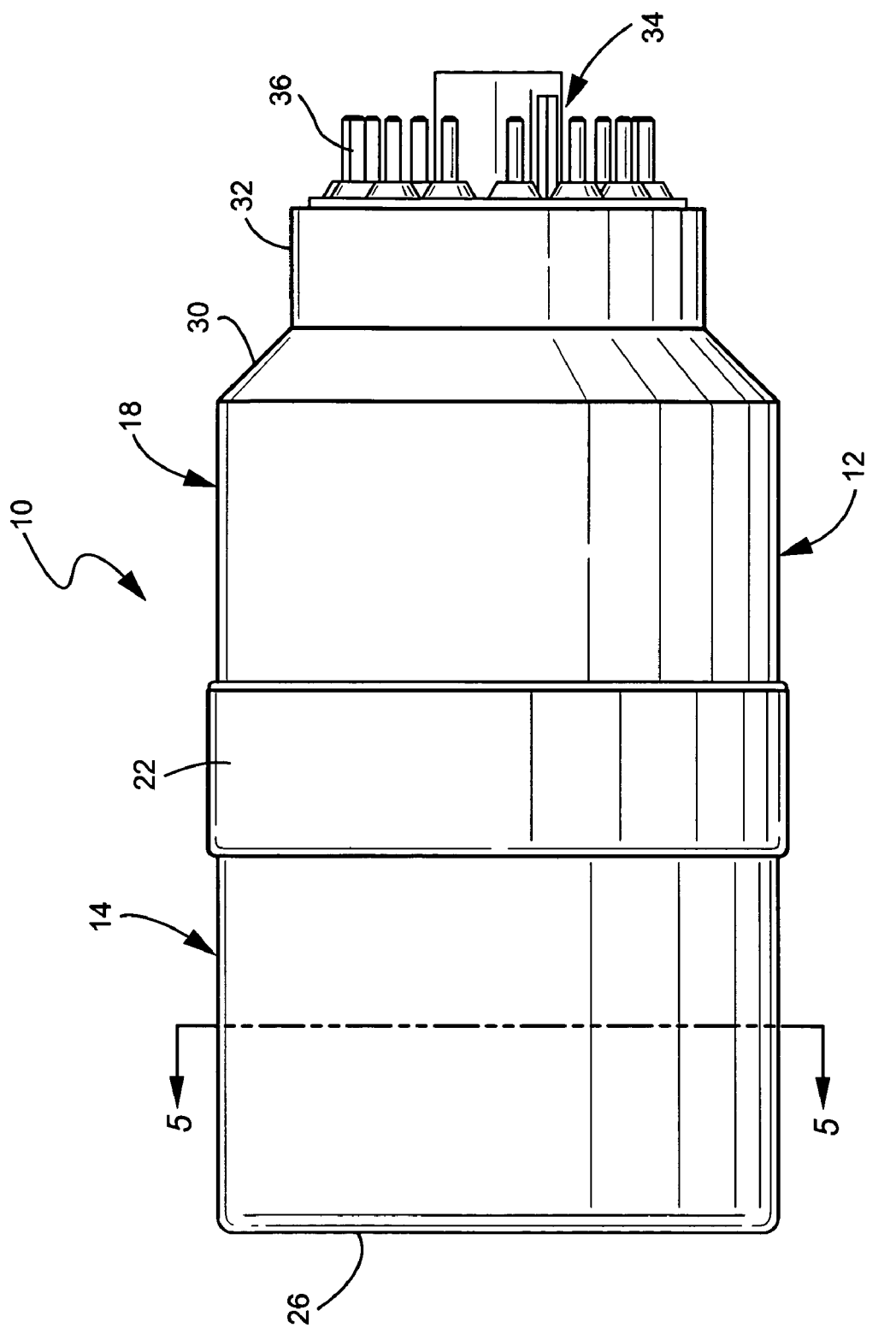
FIG. 1 is a side elevation of a radiation detector in accordance with a first exemplary embodiment.
Figure 2:
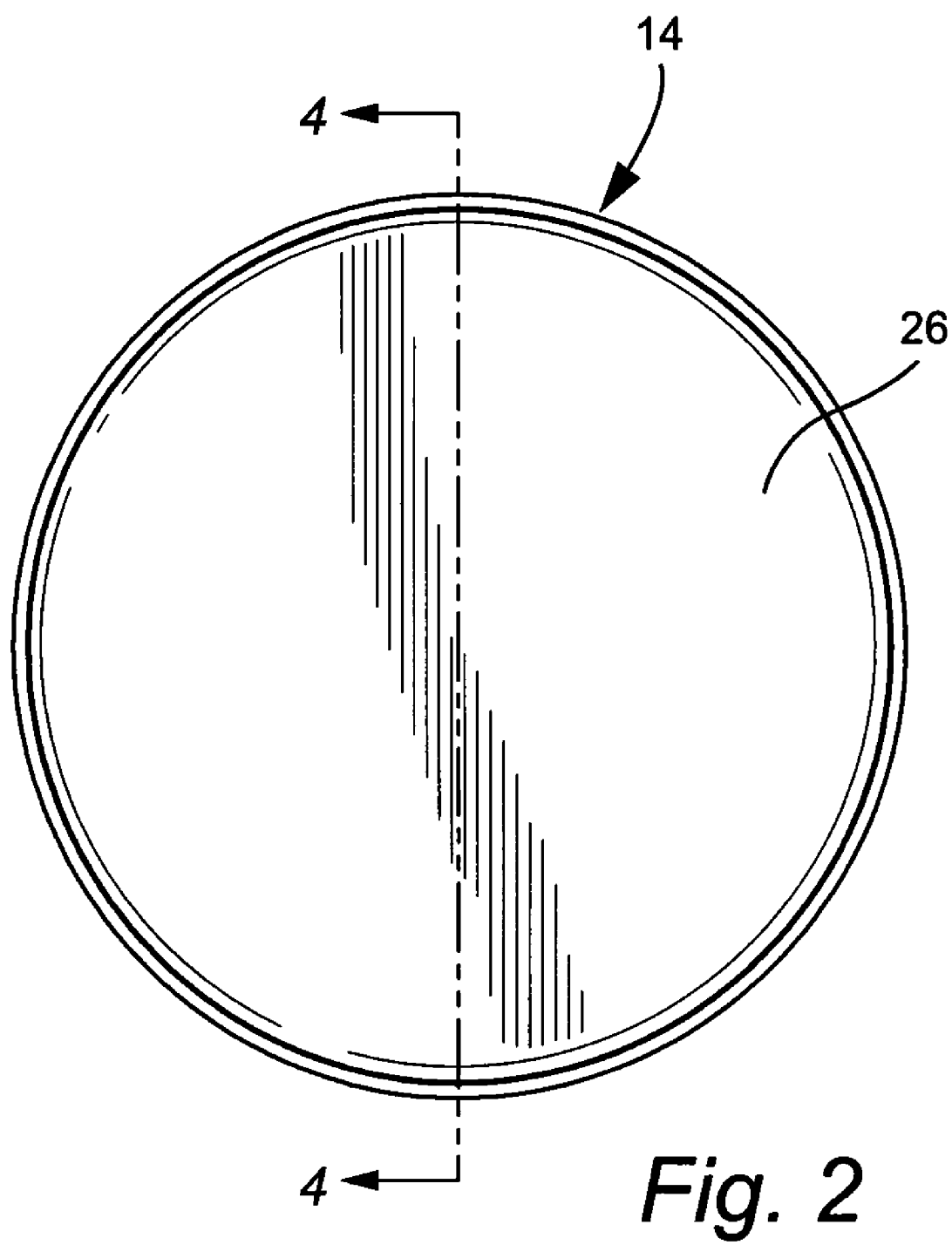
FIG. 2 is a left end elevation of the detector shown in FIG. 1.
Figure 3:
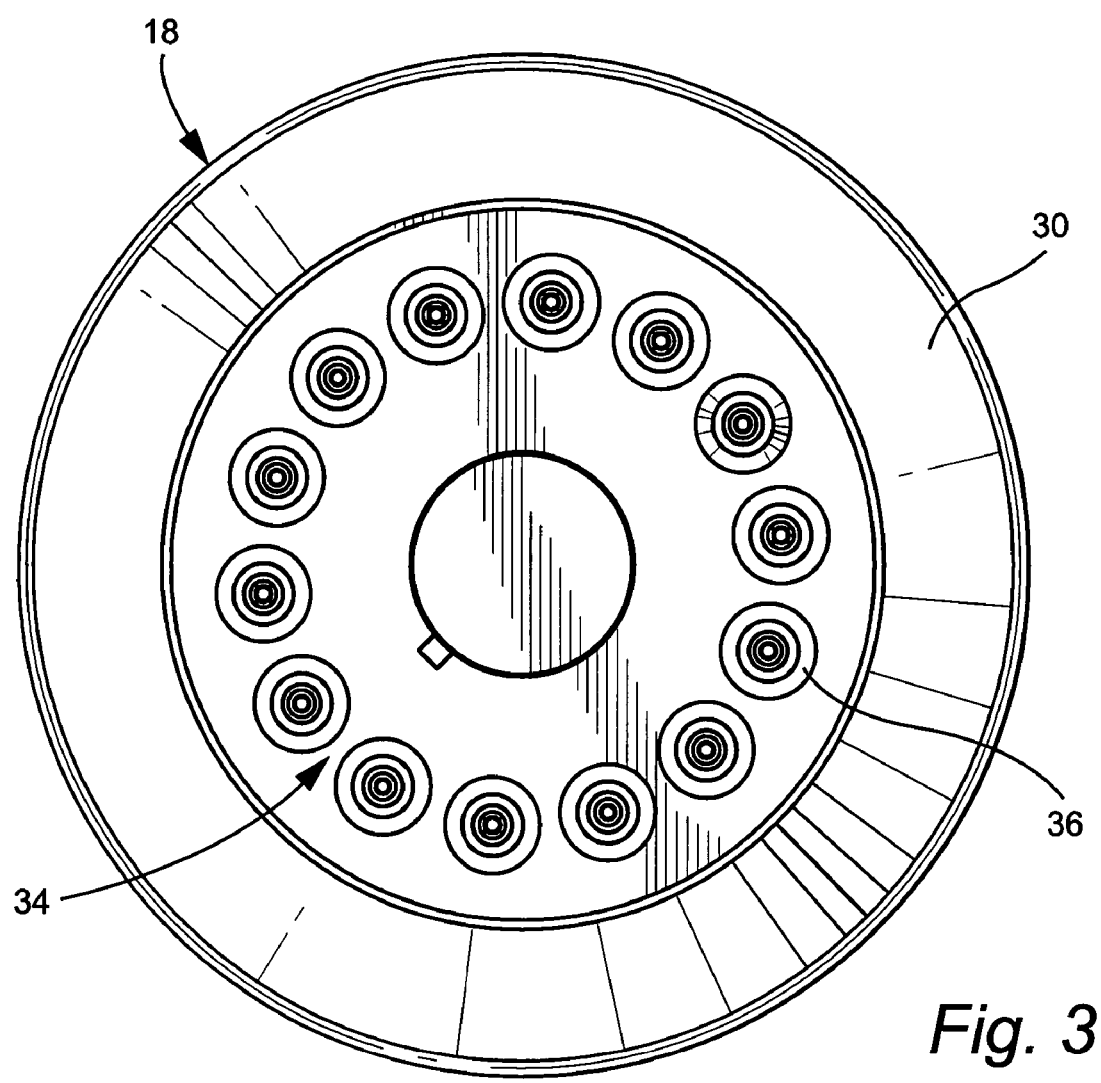
FIG. 3 is a right end elevation of the detector shown in FIGS. 1.

With reference to FIGS. 1–4, a radiation detector 10 includes a housing 12 including a metal cap 14 that encloses a cylindrical scintillation crystal 16, and a cylindrical metal shield 18 that encloses a PMT 20. An enlarged open end 22 of the cap 14 telescopes over the end of the shield 18 and is adhered to the shield via adhesive 24. The housing portions 14, 18 are of generally elongated cylindrical shape, with cap 14 closed at its opposite end by an integral end wall 26. A distal end 28 of the metal shield 18 tapers at 30 to a smaller diameter free end 32 through which an electronics package 34 protrudes. Connectors 36 are adapted to receive cables that transmit the collected data to a monitoring device (not shown). Both the cap 14 and shield 18 are preferably made of any suitable plastic or metal material (e.g., aluminum) or where desired, a suitable magnetic shielding alloy such as Mumetal® (Ni77/Fe14/Cu5/Mo4).

Figure 6:
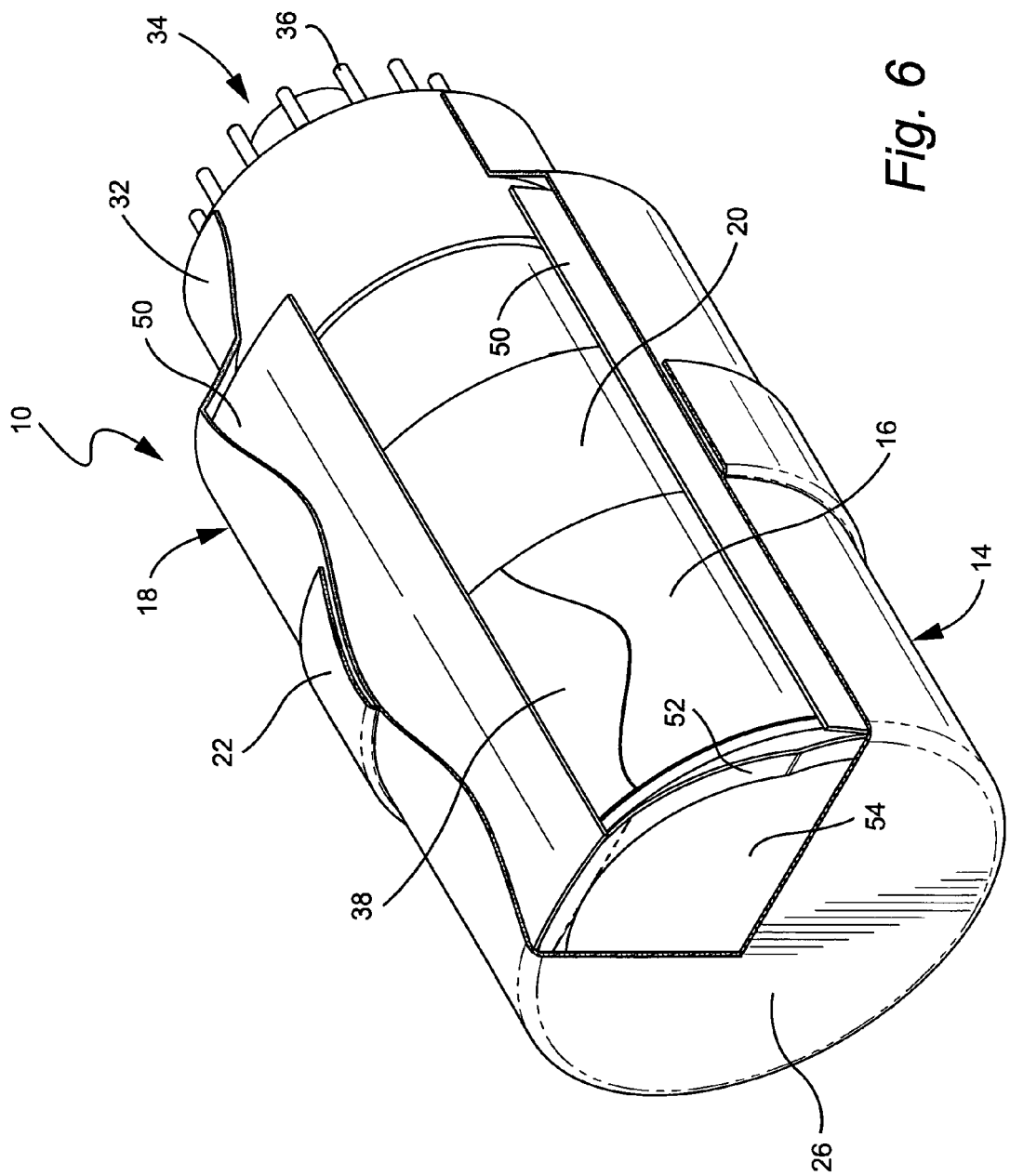
FIG. 6 is a partially cut away perspective view of the detector shown in FIG. 1.

The crystal 16 may be wrapped in a reflective tape 38 (e.g., Teflon®) (FIG. 6) and sized and shaped to fit within the metal cap 14, with a predetermined radial clearance to accommodate the suspension system described further herein. The crystal itself may be a cylindrical sodium iodide crystal doped with thalium (NaI(Tl)). Typical measurements for the crystal may be 1" in diameter×1" long, up to 4" in diameter and 4" long. These particular dimensions are not exclusive, however, but merely represent the general boundaries that those knowledgeable in the art have used previously to build radiation detectors for similar purposes.

Figure 4:
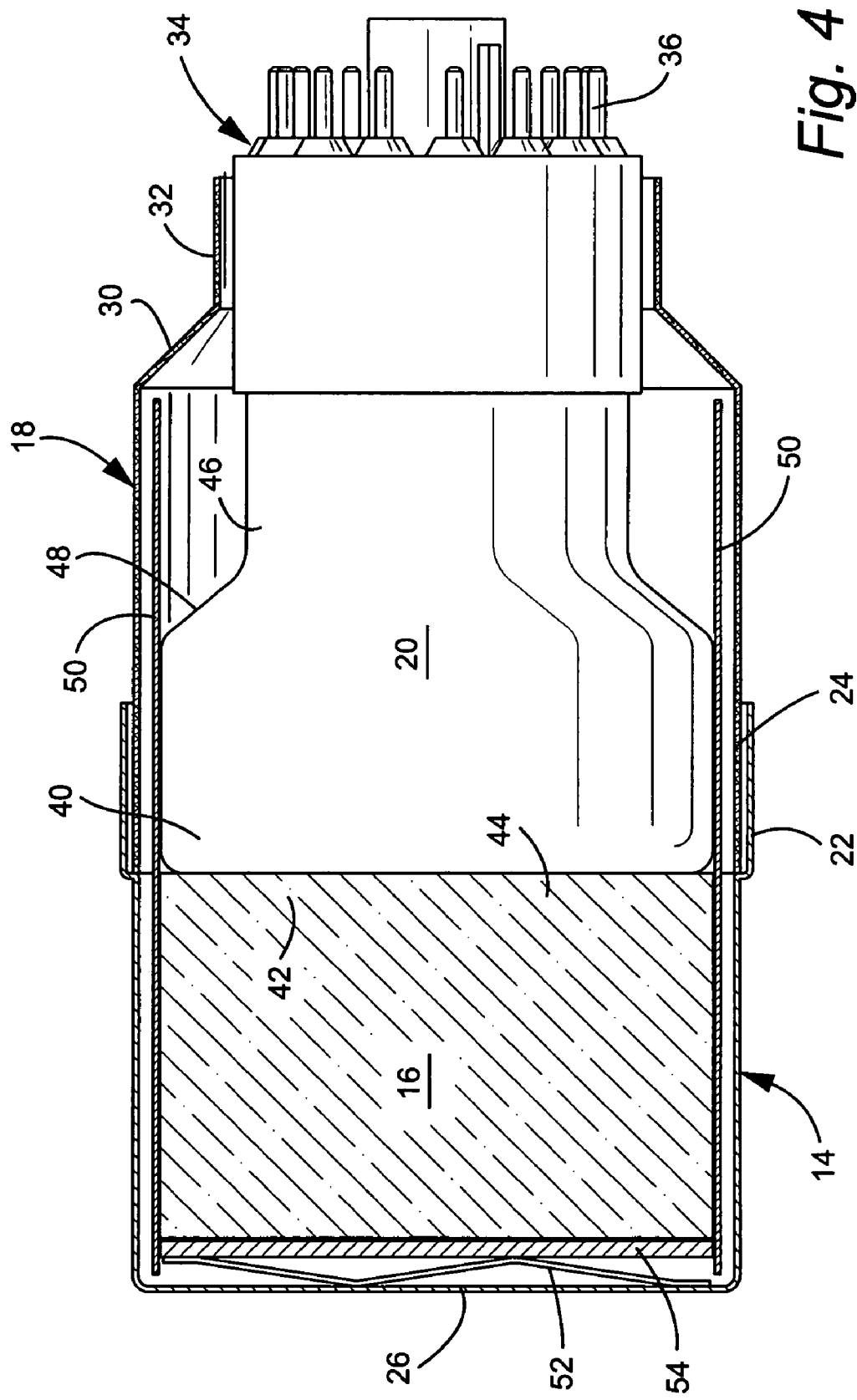
FIG. 4 is a cross-sectional view of the detector taken along the line 4—4 in FIG. 2.

The PMT 20 may be any of several commercially available PMT's. In the illustrated example, the PMT has one end 40 with a diameter substantially identical to that of the crystal 16, with respective flat faces 42, 44 engaged or coupled as shown in FIG. 4. A reduced diameter end 46, connected to end 40 via annular taper 48, is connected to the electronics package 34. Other detectors may incorporate uniform-diameter PMT's, and the invention here is not limited to any particular PMT configuration.

Figure 5:
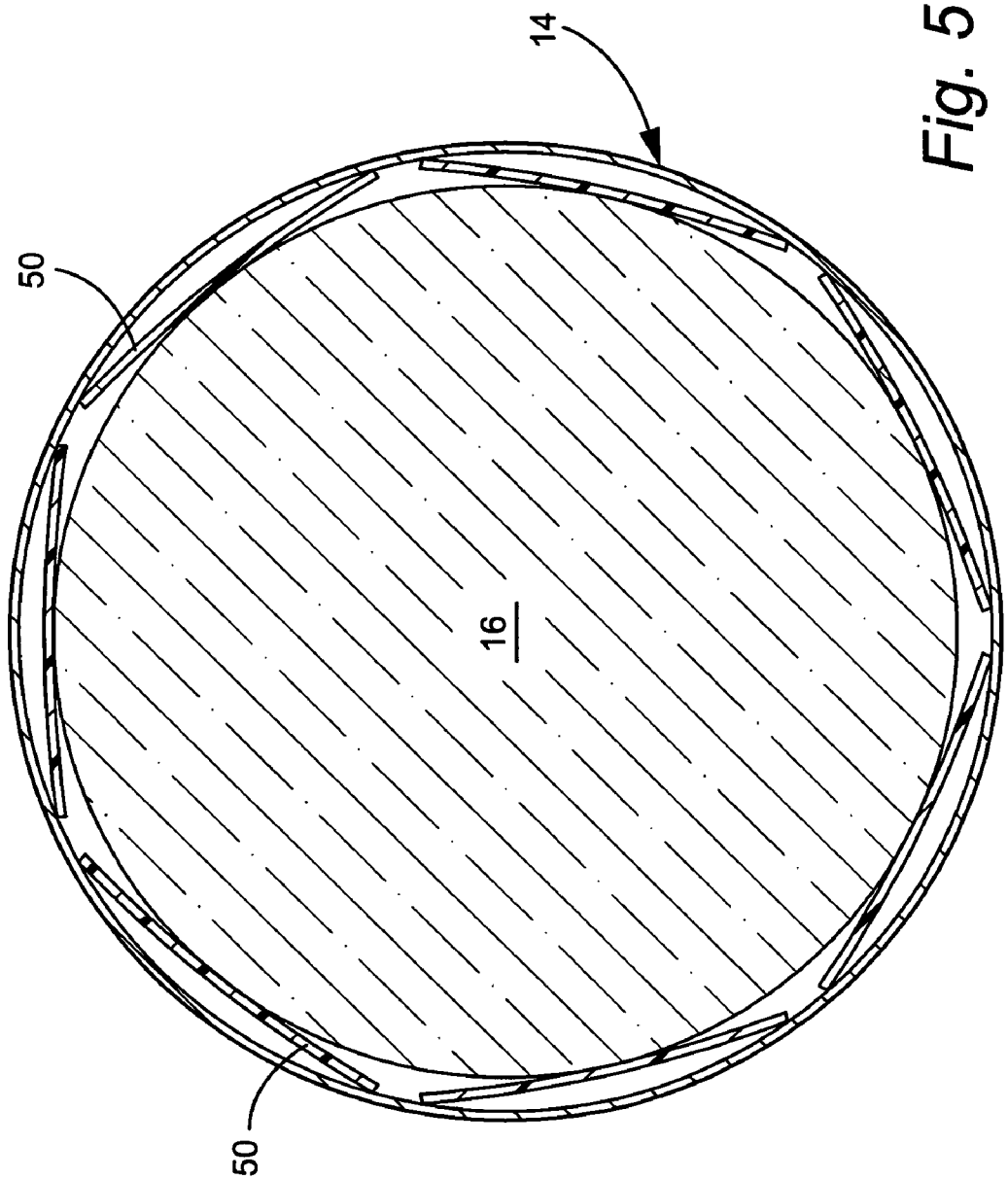
FIG. 5 is a cross-sectional view of the detector taken along the line 5—5 in FIG. 1.

In accordance with one exemplary embodiment, a plurality of elongated, flat springs 50 are inserted into the housing 12, as best seen in FIG. 5, in a circumferentially spaced array, radially between the crystal 16 and PMT 20 on the one hand, and the housing 12 on the other. Springs 50 are advantageously farmed of non-metallic material, and preferably any suitable plastic or ceramic material which attenuates gamma rays less than spring steel, but provides an adequate degree of shock and vibration isolation. One suitable material is white Delrin®, available from Du Pont, Springs 50 extend axially, i.e., in a direction parallel to the longitudinal axis of the detector, along substantially the entire length of the crystal and PMT, and are under flexion in that same direction.

The detector suspension system may also include at least one annular wave spring (FIGS. 4 and 6) located axially between a compression plate 54 (e.g., 0.030 inch thick white Delrin® or aluminum or other suitable materials) and the end wall 26. The spring 52 may be made of any suitable metal but could also be ceramic. It will be appreciated, however, that the wave spring 52 may be replaced by a suitable foam pad or other equivalent resilient member.

The detector as described functions well at low levels of gamma radiation, for example, below 60 KeV, because the plastic or ceramic springs 50 do not attenuate gamma rays to the same degree as typical metal springs.

The radiation detector as described may be used as a handheld gamma radiation detector inside a housing and used near an area through which people and vehicles, cargo or other similar things may pass. It may also be beneficial in conjunction with portals that "see" large amounts of vibration such as near trains and the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radiation detector comprising a housing; a substantially cylindrical scintillation crystal and a photomultiplier tube supported in said housing; and a plurality of flat, elongated non-metallic springs extending along said crystal and said photomultiplier tube, radially between said crystal and photomultiplier tube and said housing, said non-metallic springs, in use, minimizing attenuation of gamma rays passing into the detector.

2. The radiation detector of claim 1 wherein said springs are composed of plastic material.

3. The radiation detector of claim 1 wherein said springs are composed of ceramic material.

4. The radiation detector of claim 1 wherein said springs extend axially along at least part of said crystal and photomultiplier tube.

5. The radiation detector of claim 1 wherein said springs are under flexion in a direction substantially parallel to a longitudinal axis of said detector.

6. The radiation detector of claim 1 wherein said housing is also cylindrical, and at least one resilient member is located at one end of said crystal, axially between an end wall of said housing and said one end of said crystal.

7. The radiation detector of claim 6 wherein said at least one resilient member comprises at least one annular wave spring.

8. The radiation detector of claim 7 wherein compression plates are located on opposite axial sides of said at least one annular wave spring.

9. The radiation detector of claim 1 wherein said photomultiplier tube is substantially round in cross section, with relatively larger and smaller diameter portions connected by a taper.

10. The radiation detector of claim 1 wherein an electronics package is coupled to a distal end of said photomultiplier tube.

11. The radiation detector of claim 1 wherein said housing includes a substantially cylindrical cap telescopically joined at one end thereof to a cylindrical shield portion of said housing.

12. A radiation detector comprising a housing, a substantially cylindrical crystal and a photomultiplier tube supported in said housing; a plurality of flat, elongated plastic or ceramic springs circumferentially spaced about and extending along said crystal and said photomultiplier tube, radially between said crystal and photomultiplier tube and said housing; and at least one resilient member located at one end of said crystal, axially between an end wall of said housing and said crystal, said non-metallic springs, in use, minimizing attenuation of gamma rays passing into the detector.

13. The radiation detector of claim 12 wherein said at least one resilient member comprises an annular wave spring.

14. The radiation detector of claim 13 wherein a compression plate is located axially between said annular wave spring and said crystal.

15. The radiation detector of claim 12 wherein said photomultiplier tube is formed with relatively larger and smaller diameter portions connected by a taper.

16. The radiation detector of claim 15 wherein an electronics package is coupled to a distal end of said photomultiplier tube.

17. The radiation detector of claim 12 wherein said crystal is wrapped in a reflective material.

18. The radiation detector of claim 12 wherein said housing includes a substantially cylindrical cap telescopically joined at one open end thereof to a cylindrical shield portion of said housing.

19. A radiation detector comprising a housing, a substantially cylindrical crystal and a photomultiplier tube supported in said housing; ceramic radial suspension means located radially between said crystal and photomultiplier tube assembly and said housing; and axial suspension means located at one end of said crystal, axially between an end wall of said housing and said crystal, said ceramic radial suspension means, in use, minimizing attenuation of gamma rays passing into the detector.

* * * * *